United States Patent
Pernin et al.

[11] Patent Number: 5,962,059
[45] Date of Patent: Oct. 5, 1999

[54] AERATED LACTIC PROTEIN AND CRYSTALLIZED FAT FOOD PRODUCT AND ITS PREPARATION

[75] Inventors: Jacques Pernin, Corseaux; Junkuan Wang, Lausanne, both of Switzerland

[73] Assignee: Nestec S.A., Vevey, Switzerland

[21] Appl. No.: 08/924,592

[22] Filed: Sep. 4, 1997

[30] Foreign Application Priority Data

Sep. 5, 1996 [EP] European Pat. Off. .............. 96202457

[51] Int. Cl.[6] ..................................... A23C 9/15
[52] U.S. Cl. .......................... 426/564; 426/570; 426/572; 426/585; 426/588
[58] Field of Search .................................. 426/564, 570, 426/572, 585, 588

[56] References Cited

U.S. PATENT DOCUMENTS

| | | | |
|---|---|---|---|
| 4,325,979 | 4/1982 | Trop | 426/570 |
| 4,379,176 | 4/1983 | Scherwitz et al. | 426/572 |
| 4,438,147 | 3/1984 | Hedreck | 426/585 |
| 4,711,788 | 12/1987 | Porcello | 426/572 |
| 4,834,991 | 5/1989 | Porcello | 426/572 |
| 5,102,680 | 4/1992 | Glass | 426/572 |
| 5,135,768 | 8/1992 | Campbell | 426/570 |
| 5,238,698 | 8/1993 | Zumbe | 426/572 |
| 5,284,674 | 2/1994 | Fazio | 426/585 |
| 5,366,750 | 11/1994 | Morano | 426/572 |
| 5,393,549 | 2/1995 | Badertscher | 426/564 |
| 5,529,800 | 6/1996 | Bourns | 426/572 |
| 5,529,801 | 6/1996 | Morano | 426/572 |
| 5,612,078 | 3/1997 | Fileti | 426/572 |
| 5,626,903 | 5/1997 | Gautchier | 426/572 |
| 5,629,041 | 5/1997 | Laaman | 426/572 |
| 5,723,164 | 3/1998 | Morano | 426/572 |
| 5,759,609 | 6/1998 | Lynch | 426/564 |

FOREIGN PATENT DOCUMENTS 0607471  1/1993  European Pat. Off. .

OTHER PUBLICATIONS

Minifie 1989 Chocolate, Cocoa, and Confectionery Chapman & Hall, New York pp. 144–148, 303 & 304.
Beckett 1988 Industrial Chocolate Manufacture and Use Blackie Academic & Professional New York pp. 51–53.

*Primary Examiner*—Carolyn Paden
*Attorney, Agent, or Firm*—Vogt & O'Donnell, LLP

[57] ABSTRACT

An aerated food product useful as a garnish for preparation of composite products, which may include a baked product such as biscuits wherein the food product is positioned between the biscuits. The food product has a crystalline fat structure and is prepared by mixing skimmed milk powder, a sugar and a sugared concentrated milk, mixing a lipid composition with that mixture to obtain a lipid-added mixture containing from 30% to 60% fat and having a dry matter content of from 80% to 90%, wherein the lipid composition has, by weight, at a temperature of 30° C., a solids content of at least 8%, and then while being cooled to an ambient temperature, the lipid-added mixture is kneaded mechanically and injected with an inert gas to obtain the aerated food product.

23 Claims, No Drawings

AERATED LACTIC PROTEIN AND CRYSTALLIZED FAT FOOD PRODUCT AND ITS PREPARATION

BACKGROUND OF THE INVENTION

The present invention relates to a food product in the form of an aerated mass for pastry, biscuit and confectionery-making, a process for manufacturing the said food product, and also a composite biscuit/confectionery-making product comprising the said aerated food product as a garnish.

There is known, for example from Great Britain Complete Patent Specification No. 1 261 910, an aerated, lactic protein-based and lactose-based spread which is prepared from an aqueous lactic dispersion acidified by fermentation by thermophilic bacteria and which, after the addition of a fatty phase, is transformed into an emulsion, pasteurized and then cooled while at the same time being mechanically kneaded, for example in a scraped surface heat exchanger, in which it is simultaneously aerated by the incorporation of an inert gas. A product of this kind is intended to be stored under refrigeration.

It is known, for example through patent application European Patent Application Publication No. 0 607 471, to prepare a lactic protein-based, sugared, proteinic food product which presents itself in the form of an aerated mass with a firm, unctuous texture and a neutral milky taste. A product of this kind keeps for a certain period without any change in structure, on condition, however, that it is refrigerated, for example at 8 to 15°C.

SUMMARY OF THE INVENTION

The object of the present invention is to provide a food product containing a large quantity of milk proteins, presenting itself in the form of an aerated mass, possessing a firm texture which may range from unctuous to crisp, and being capable of retaining its properties when kept for a prolonged period at ambient temperature, that is to say up to 30°C., while at the same time remaining organoleptically and physico-chemically stable, and being characterized in that it is prepared without the incorporation of thickening or gelling additives and without emulsification or pasteurizing heat treatment, all of these being measures capable of giving body to the said mass.

The invention provides a food product in the form of an aerated mass for biscuit/confectionery-making, containing lactic proteins, sugars, fats and water, characterized in that the aerated mass is in an essentially non-emulsified form, that it is physico-chemically and organoleptically stable at up to 30° C., that it does not contain any thickening or gelling additives, that its dry matter content is 80 to 90% by weight, that it contains 30 to 60% by weight of fat and that the fat has a solids content greater than or equal to 8% by weight at 30° C.

The invention also provides a process for preparing the above food product wherein a mixture comprising skimmed milk powder, sugared concentrated milk and sugars is prepared, a lipid phase, at a temperature such that the fat contained in the said lipid phase is liquid, is added to the mixture, the added fat mixture is cooled to ambient temperature while being kneaded mechanically and aerated by the injection of an inert gas.

DETAILED DESCRIPTION OF THE INVENTION

An important feature of the invention is that the structure of the mass is provided by the nature and state of the fat at a temperature of as high as 30° C. The choice of fat thus plays a determining role in the consistency of the present mass. The latter must be partly in crystallized form, so that the fat crystals are capable of forming a network retaining in its meshes the fat which is still liquid. Thus, the structure obtained is very different from that of an emulsion.

This structural and textural objective is attained particularly when use is made, in a preponderant manner in the mixture of fats, of a fat having high compatibility with the other fats, particularly with the lactic fat, in plain terms, in such a way as to form only a minimum of eutectic with the other fats of the mass and having a solid matter content which is relatively constant around ambient temperature and, in particular, in the range from 15 to 30° C.

Within this framework, use is preferably made of a mixture of fats containing a vegetable fat or vegetable fat fraction which has a behavior on melting characterized by a flat curve in the region from 15 to 30° C., for example of the type called "cocoa butter equivalent", hereinafter CBE, that is to say, the behavior of which on melting is very similar to cocoa butter. A preferred mixture of fats comprises, by weight, 60 to 75% of CBE, 20 to 35% of hydrogenated vegetable oil of the shortening type, or vegetable oil or vegetable oil fraction which is rich in oleic acid, and 0 to 10% of lactic fat. As the vegetable oil, mention may be made, for example, of sunflower oil, soya oil, corn oil or groundnut oil. As the vegetable oil fraction, mention may be made, for example, of palm olein.

A particularly suitable mixture of fats contains 30 to 60% by weight of solid matter at 20° C. and 8 to 30% by weight of solid matter at 30° C.

The product may be aromatized, for example by adding a fruit, vanilla, cocoa powder or coffee aroma. It may contain vitamins, minerals and amino acids.

In a preferred mode of embodiment, the product contains calcium added in the form of salt, for example carbonate salt, corresponding, for example, to about 1 to 2% by weight of the product.

One advantage of the present invention is that the food product thus prepared has an aerated structure, a smooth texture ranging from frothy and creamy to compact and crisp, and also has lactic, aromatic flavors.

Another advantage is that of permitting the preparation of a product having good physico-chemical and organoleptic stability after being kept for several months at ambient temperature, and even at up to 30° C.

Another advantage is that of permitting the preparation of a nutritionally balanced product which is rich in milk proteins and may contain at least 50% of raw materials of lactic origin.

The mixture contains at least one sugar. This makes it possible, on the one hand, to reduce the water activity value of the final aerated product, and thus ensure good microbiological keeping of the product, and on the other hand, to obtain, after the incorporation of a gas, a firm foam which will retain its firmness during storage at ambient temperature and even at up to 30° C.

It is possible to add, for example, a polysaccharide, some saccharose and/or some invert sugar.

It is also possible to add a ballast agent, for example some maltodextrin.

In carrying out the process and preparing the product of invention, it is possible to bring the temperature or the sugars to 30 to 50° C., and then add them. An aqueous phase is thus obtained which presents itself in the form of a pumpable mass with a 60 to 70% dry matter content.

A lipid phase is also prepared and the constituent compounds of the lipid phase are chosen according to the properties desired, and are then mixed.

To prepare the lipid phase, it is possible to raise the temperature of the mixture of the various fats to around 45 to 50° C., so as to obtain a homogeneous lipid phase and to permit the subsequent handling, for example pumping, thereof.

The lipid phase and the aqueous phase are then mixed.

The mixture is then aerated, for example by the injection of an inert gas into the mass. It is thus possible to inject nitrogen, while at the same time maintaining a temperature of 20 to 30° C., with mechanical action.

A food product is obtained which presents itself in the form of an aerated mass having a firm and stable consistency, the foam of which is fine and "holds together" well, that is to say does not sink down again and/or run after being kept and/or handled, and which likewise has a texture which is creamy, unctuous and smooth to the taste. This product may likewise be defined with the aid of the following characteristics:

volumic mass: about 500 to 1000 g/l, water content: 10 to 20%, fat content: 30 to 60% by weight, and water activity: about 0.65 to 0.77.

The invention also concerns the use of the said aerated food product as a garnish in a composite product that comprises, in addition, a baked product.

Finally, the invention concerns the said composite product which is made up of at least two parts of the baked product separated by the said aerated food product and is, if necessary, coated with chocolate or with a fat-based coating mass.

This product may be kept for a certain period, say several months, at a temperature of as high as 30° C.

The food product may then be used in the preparation of a composite product made up, in addition, of at least two parts of a baked product, between which the aerated food product is disposed as a garnish. The resulting composite product may be coated, for example, with milk chocolate.

As the baked product, use may be made, for example, of biscuit, sponge cake or a bap roll, or possibly a milk roll.

EXAMPLES

The invention is illustrated in greater detail in the following exemplified embodiments. In these examples, the portions and percentages are by weight, unless otherwise indicated.

The solid matter content (SFC) of the lipid phase is measured by pulsed nuclear magnetic resonance (IUPAC method 2.150 6.3.2).

Example 1

Some skimmed milk in powdered form, maltodextrin, calcium carbonate, salt and vanillin, representing 10.36 kg, was mixed and then 23.76 kg of sugared concentrated milk at 20 to 22° C. was added with a planetary mixer without great abrading force. 14.6 kg of a mixture of invert sugar syrup and glucose syrup at 45° C. was added little by little. This mass constituted the aqueous phase.

A lipid phase was prepared in the following manner. 31.2 kg of fat composed of 68% ILLEXAO (CBE), 24% BISCUITINE N and 8% lactic fat, to which a quantity of lecithin corresponding to 0.1% of the mass of liquid mixture (fatty phase+aqueous phase) was added, mixed with moderate stirring, in a thermostatically controlled vat at 45 to 47° C.

The lipid phase has 38.2% solid matter at 20° C. and 12.1% solid matter at 30° C.

After mixing the aqueous phase and the lipid phase with a planetary mixer without great abrading force, and therefore without emulsification, a pumpable liquid was obtained, the temperature of which was 30 to 32° C. and which was pumped through a first scraped surface heat exchanger, where it was cooled to 25 to 26° C., while at the same time being kneaded mechanically, and from there through a second scraped-surface heat exchanger, where it was cooled to 22 to 23° C., while at the same time being kneaded mechanically, and into which nitrogen was injected.

A single-scraped surface heat exchanger may be used instead of the above two heat exchangers mounted in series.

A homogeneous, firm, vanilla-aromatized cream was thus obtained, which could be kept at a temperature of as high as 30° C. for 6 months without any change in texture or flavour.

This vanilla cream had the following characteristics:

| | |
|---|---|
| dry matter content | 87% |
| pH | 7.0 |
| water activity value (Aw) | 0.76 |
| fat content | 41.87% |
| of which lactic fat | 5.67% |
| proteins content (all of lactic origin) | 7.8% |
| volumic mass | 610 g/l |
| texture and consistency | firm, frothy, smooth and crisp |

Examples 2 to 6

The procedure followed was as in Example 1, with lipid phases having the compositions and solid matter contents (SFC) indicated in table 1 below, the CBE being the same as in Example 1.

TABLE 1

| Composition of fats | Example | | | | |
|---|---|---|---|---|---|
| (%) | 2 | 3 | 4 | 5 | 6 |
| CBE | 68 | 72 | 72 | 72 | 72 |
| Palm olein | 24 | — | — | — | — |
| Sunflower oil rich in oleic acid | — | 20 | — | — | — |
| Soya oil | — | — | 20 | — | — |
| Ground nut oil | — | — | — | 20 | — |
| Corn oil | — | — | — | — | 20 |
| Lactic fat | 8 | 8 | 8 | 8 | 8 |
| SFC, 20° C. | 38.2 | 41.3 | 41.3 | 40.3 | 41.3 |
| SFC, 30° C. | 14.1 | 15.4 | 15.5 | 15.1 | 15.8 |

In all the cases, the properties of the products obtained were similar to those of the product in Example 1.

Example 7

A thin strip of sponge cake about 5 mm thick was manufactured by applying, in a thin layer over the entire width of the metal strip of a continuous strip oven, and by baking, a paste composed of water, almond paste, glucose syrup, BISCUITINE N, egg concentrate containing 50% of sugar, and emulsifier, which was mixed with some cornflour, corn-starch, skimmed milk powder, vanilla powder, salt, sugar and baking-powder.

After the transverse cutting-out of rectangular slabs, these slabs of sponge cake were impregnated with an alcoholized syrup, the aerated mass prepared in accordance with Example 1 was deposited thereon in a layer about 5 mm thick as a garnish, then the garnish was covered with a rectangular slab of sponge cake having the same dimensions as the one used as a support for the garnish, which resulted in filled slabs composed of aerated mass between two layers of sponge cake. After the filled slabs had been cut out into fingers of parallelepipedal shape, the fingers were coated with a coating of milk chocolate, and the coated articles were placed on small cartons and were individually packed hermetically in flexible packaging made of metallized directional polypropylene.

The articles kept for 6 months without any change in structure, texture or flavour, at a temperature of as high as 30° C.

We claim:

1. A process for manufacturing a food product comprising:

mixing ingredients comprising a skimmed milk powder, a sugar and a sugared concentrated milk to obtain an ingredient mixture and mixing a lipid composition with the ingredient mixture, wherein the lipid composition has, by weight, at a temperature of 30° C., a solids content of at least 8%, and wherein the ingredient mixture and the lipid composition and are at a temperature so that a lipid-added mixture is obtained in which the lipid composition has a liquid form and wherein the lipid-added mixture comprises, by weight, from 30% to 60% fat and has, a dry matter content of from 80% to 90%; and kneading the lipid-added mixture mechanically and while kneading, cooling the lipid-added mixture being kneaded to an ambient temperature and injecting an inert gas into the lipid-added mixture being kneaded and cooled to obtain a cooled aerated mixture having a volumic mass of from about 500 g/l to 1000 g/l and a water activity of from 0.65 to 0.77.

2. A process according to claim 1 wherein the lipid composition has, by weight, at a temperature of 30° C., a solid matter content of from 8% to 30%.

3. A process according to claim 2 wherein the lipid composition has, by weight, at a temperature of 20° C., a solid matter content of from 30% to 60%.

4. The aerated mixture product of claim 3.

5. The aerated mixture product of claim 2.

6. A process according to claim 1 or 2 wherein the lipid composition comprises a cocoa butter equivalent which has, at a temperature of from 10° C. to 30° C., a solid matter-content-flat-curve melting behavior.

7. A process according to claim 6 wherein the lipid composition comprises the cocoa butter equivalent in an amount by weight of from 60% to 75%.

8. A process according to claim 7 wherein the lipid composition comprises a lipid substance selected from the group consisting of a vegetable oil and a fraction of a vegetable oil, wherein when the lipid composition is a vegetable oil, the lipid composition is selected from the group consisting of hydrogenated oil shortening and a vegetable oil comprising oleic acid and wherein when the lipid composition is a vegetable oil fraction, the lipid composition comprises a vegetable oil fraction comprising oleic acid.

9. A process according to claim 8 wherein the oil is a vegetable oil and is selected from the group consisting of sunflower oil, soya oil, corn oil and groundnut oil and wherein the oil fraction is palm olein.

10. The aerated mixture product of claim 9.

11. A process according to claim 7 wherein the lipid composition comprises a lactic fat and the lactic fat is present and in an amount of up to 10% by weight based upon the lipid composition weight.

12. The aerated mixture product of claim 6.

13. A process according to claim 1 wherein the lipid composition comprises a lipid substance selected from the group consisting of a vegetable oil and a fraction of a vegetable oil, wherein when the lipid composition is a vegetable oil, the lipid composition is selected from the group consisting of hydrogenated oil shortening and a vegetable oil comprising oleic acid and wherein when the lipid composition is a vegetable oil fraction, the lipid composition comprises a vegetable oil fraction comprising oleic acid.

14. A process according to claim 13 wherein the oil is a vegetable oil and is selected from the group consisting of sunflower oil, soya oil, corn oil and groundnut oil and wherein the oil fraction is palm olein.

15. A process according to claim 1 further comprising mixing calcium carbonate with the skimmed milk powder, sugar and concentrated milk in an amount so that calcium carbonate is present in the aerated mixture in an amount by weight of from 1% to 2%.

16. The aerated mixture product of the process of claim 15.

17. A process according to claim 1 further comprising mixing maltodextrin with the skimmed milk powder, sugar and concentrated milk to obtain the mixture.

18. The aerated mixture product of the process of claim 17.

19. A process according to claim 1 wherein the skimmed milk powder, the sugar and concentrated milk are mixed at a temperature of from 30° C. to 50° C. to obtain a heated mixture and wherein the lipid composition added to the heated mixture has a temperature of from 45° C. to 50° C. and wherein the lipid-added mixture, while kneading and aerating, is cooled to a temperature of from 20° C. to 30° C.

20. A process according to claim 19 wherein the heated mixture is prepared so that the heated mixture has, by weight, a dry matter content of from 60% to 70%.

21. A process according to claim 20 wherein the lipid composition is added to the heated mixture so that the lipid-added mixture has the dry matter content of from 80% to 90% by weight.

22. A process according to claim 1 wherein the aerated mixture is prepared in the absence of thickening and gelling agents.

23. The aerated mixture product of claim 1.

* * * * *